[Patent 3,441,519 — Apr. 29, 1969]

3,441,519
EPOXY RESIN HAVING AT LEAST ONE ACTIVE METHYLENE ETHER DIRECTLY CONNECTED TO TWO AROMATIC NUCLEI AND A PROCESS FOR PRODUCING THE SAME

Ching Yun Huang, Minoo-shi, and Masayoshi Maeda, Itami-shi, Japan, assignors to Japan Gas-Chemical Company, Inc., Tokyo, Japan, a corporation of Japan
No Drawing. Filed July 20, 1964, Ser. No. 383,961
Claims priority, application Japan, July 22, 1963, 38/39,201
Int. Cl. C08g 30/02
U.S. Cl. 260—2      10 Claims

ABSTRACT OF THE DISCLOSURE

A process for producing an epoxy resin having at least one active methylene ether radical (—$CH_2OCH_2$—) directly connected to two aromatic hydrocarbon nuclei in the molecular chain and an average of from 1.6 to 2.0 terminal vicinal epoxy radicals which comprises reacting a polyaromatic hydrocarbon glycol or dimethylol aromatic hydrocarbon formaldehyde resin with epichlorohydrin in the presence of a Friedel-Crafts catalyst and then diglycidylating with an alkali metal hydroxide. The produced resin is a useful heat-resistant epoxy resin because the active methylene ether groups in addition to the epoxy groups contribute to cross-linking reactions.

---

This invention relates to a novel epoxy resin having epoxy radicals at both ends of the molecule and at least one active methylene ether radical directly connected to two aromatic nuclei in the molecule and a method for producing the same. More particularly it relates to a novel epoxy resin obtained by the reaction of a resin having terminal methylol radicals with an epichlorohydrin and then with a caustic alkali and to a method for producing the same.

Conventional epoxy resins are reaction products of Bisphenol-A or its derivatives with an epichlorohydrin. They are represented by a general formula:

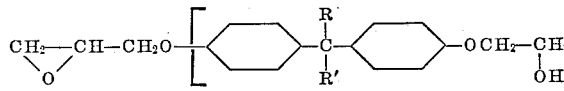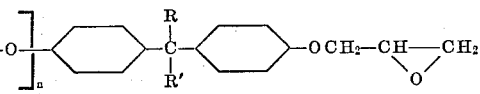

There are many kinds of them, from low molecular weight polymers to relatively high-molecular weight ones, according to the number of $n$ ranging from 1 to 10. They are useful as principal raw materials for excellent cured articles in various kinds of application. However, the number of epoxy radical cannot be more than 2 per one molecule, regardless of their molecular weight. Hence it has been necessary to use an epoxy resin having relatively low molecular weight to increase the density of cross-linkage at the time of curing. This has been the origin of this kind of epoxy resin always possessing low heat resisting value. It has been frequently required to rely on an expensive curing agent to overcome this drawback.

Further the amount of a curing agent to be added to a conventional epoxy resin for the purpose of curing must correspond to the most suitable value calculated by the epoxy equivalent of epoxy resin and the kind of curing agent. When the addition of a curing agent deviates from this value, it not only makes the attempt for producing a cured object having desired properties unvailing, but also it incurs a heavy loss due to excessive use of a curing agent. It is particularly aggravating when the curing agent is expensive.

With regard to the solubility in solvents and the compatibility with other high molecular substances, conventional epoxy resins are limitative in narrow ranges. For example they are soluble in expensive solvents such as ketone or esters, but not soluble in inexpensive alcohols. Only relatively low molecular weight polymers can be dissolved in aromatic hydrocarbon solvents such as toluene and xylene which are available commercially at inexpensive price.

With regard to the compatibility with high molecular substances, low molecular weight epoxy resins have fairly good compatibility, but high molecular epoxy resins have, in general, no compatibility with alkyd resins of vegetable oil, cellulose derivatives, melamine formaldehyde resins, methacrylic resins and silicones. They have only a narrow range of compatibility with a natural rubber, synthetic rubbers and low polar vinyl resins.

It is therefore the general object of the present invention to provide an epoxy resin which has active methylene ether radicals (—$CH_2OCH_2$—) capable of reacting with a customary curing agent such as organic base, organic acid or their anhydride instead of hydroxy radicals of conventional epoxy resin thereby to increase the density of cross-linkage and to improve the heat resistance.

It is a further object to provide such an epoxy resin as to react with excessive curing agents even when the latter are present in amounts of more than epoxy equivalent and accordingly as not to require so much severity in the mixing with a curing agent. This is not only very advantageous in the operation but also enables to obtain excellent cured objects of high heat resistance due to the advantage capable of using a sufficient amount of inexpensive curing agents.

It is still a further object to provide a method for producing an epoxy resin having aforementioned advantages.

The active methylene ether in the present epoxy resin possesses the reactivity not only with curing agents for conventional epoxy resin i.e. a compound containing an active hydrogen or a resinous substance such as amines, acid anhydrides, phenol, melamine, urea, their formaldehyde resin or the like, but also with a compound which readily reacts with formaldehyde under acidic conditions, such as acenaphthene, acenaphthylene or their formaldehyde resin. In the reaction with phenols the epoxy radical and the active methylene ether have different reaction mechanism. Namely the epoxy radical reacts with the hydroxy radical of phenols, whereas the active methylene ether reacts with an active hydrogen on the aromatic nucleus.

It is thus a further object to provide such an epoxy resin as to be able to produce extremely compact cured obects that no other conventional novolak have ever afforded, by mixing with a phenol resin and utilizing the above-mentioned reactivity of the active methylene ether.

These and other objects are attained by the present invention. According to the present invention a resin having terminal methylol radicals such as polyaromatic hydrocarbon glycol, dimethylol aromatic hydrocarbon aldehyde resin or the like, is reacted with epichlorohydrin in the presence of a Friedel-Crafts type catalyst such as stannic chloride, zinc chloride or the like and resulting chlorohydrin compound is reacted with a caustic alkali to produce an epoxy resin. For example a polyaromatic hydrocarbon glycol is converted into an epoxy resin according to following reaction equation.

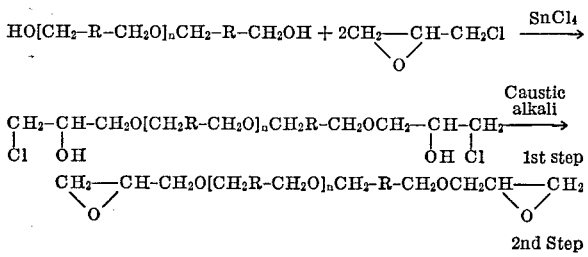

In the above equation, $n$ is an integer from 1 to 9 and R is a non-substituted or alkyl-substituted aromatic nucleus.

Polyaromatic hydrocarbon glycols used in the present invention as a resin having terminal methylol radicals are polymers expressed by following formulas.

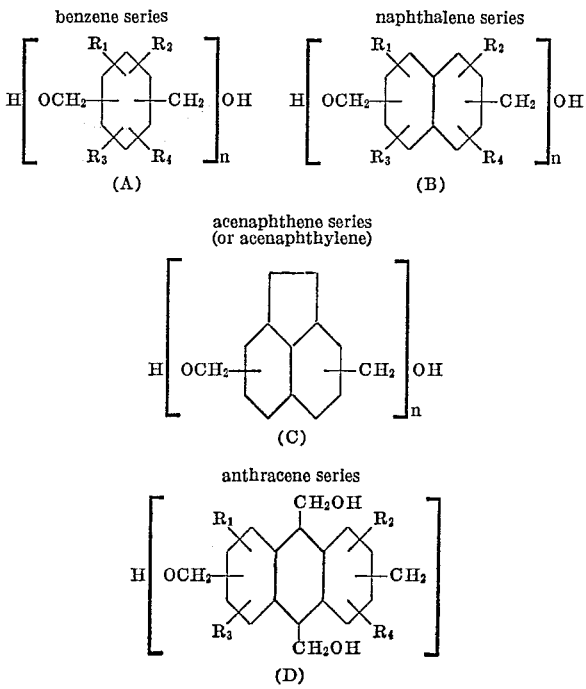

wherein $R_1 \sim R_4$ are hydrogen, ethyl, methyl, n-propyl, isopropyl, n-butyl, isobutyl, tertiarybutyl, or vinyl radical and $n$ is an integer of from 2 to 10. These resins are prepared by hydrolyzing an aromatic hydrocarbon having two chloromethyl substituents with alkali in an amount less than equivalent for hydrolyzing and neutralizing chlorine of chloromethyl radical at an elevated temperature and pressure in the presence or absence of an aromatic hydrocarbon solvent, followed by condensation.

Dimethylol aromatic hydrocarbon aldehyde resins are polymers having terminal methylol radicals obtained by, for example, acetylating oxygen-containing aromatic hydrocarbon formaldehyde resins with glacial acetic acid or acetic anhydride in the presence of an acidic catalyst such as sulfuric acid or perchloric acid, and hydrolyzing the introduced about two terminal acetyl radicals with a caustic alkali.

The above-mentioned oxygen-containing aromatic hydrocarbon formaldehyde resin has at least one active methylene ether radical ($—CH_2OCH_2—$) directly connected to two aromatic nuclei and, in addition, may have an acetal radical [$—CH_2O(CH_2O)_nCH_2—$ in which $n$ is an integer of from 1 to 4] and a methylene radical ($—CH_2—$) in the form of radicals directly connected to two aromatic nuclei as is well-known concerning aromatic hydrocarbon formaldehyde resins. These acetal and methylene radicals can be connected with the end aromatic nuclei having hydroxy groups which react with glycidyl groups, in the form of a composite group having at least one methylene ether radical in which group said acetal and methylene radicals together with the methylene ether radicals are connected through 1 to 10 alkyl-substituted or non-substituted aromatic nuclei, the terminal radicals of said composite group being radicals selected from acetal, methylene and methylene ether radicals.

The method for producing an epoxy resin of the present invention can be more fully understood by the disclosure which follows hereinafter.

A Friedel-Crafts type catalyst such as stannic chloride, zinc chloride or the like is added to a polyaromatic hydrocarbon glycol or dimethylol aromatic hydrocarbon formaldehyde resin in an amount of 0.1 to 0.2 percent by weight of the total substance. If required, a solvent which is insoluble in water, inexpensive and can be readily distilled off after completion of the reaction, such as toluene, xylene or the like, is mixed to dissolve the catalyst.

Then epichlorohydrin is gradually added to the above solution in an amount equivalent to the terminal methylol radicals of the polyaromatic hydrocarbon glycol or dimethylol aromatic hydrocarbon formaldehyde resin i.e. 2 mols vs. 1 mol of glycol. If the amount exceeds 2 mols, there may be a danger of polymerization. While preventing the entering of moisture into the reaction system, the epichlorohydrin is added at a temperature from 70° C. to 100° C. allowing the time of addition more than about 15 hours. After addition, the reaction is continued at that temperature for further 24 hours.

Subsequently a caustic alkali equivalent to epichlorohydrin, in other words twice as much equivalent as dimethylol aromatic hydrocarbon formaldehyde resin is added in the form of a 50 percent by weight aqueous solution. Before addition of caustic alkali, the surrounding bath is changed into an ice-water bath, the temperature of the content is lowered to less than 10° C., and a water-insoluble solvent i.e. aromatic hydrocarbon such as benzene, toluene, xylene, or the like or ether is added in approximately the same amount as the content. When a solvent is used in the chlorohydrin forming reaction of the first step, the amount can be reduced that much. The cooling of the content and the addition of the solvent are conducted for the precaution of polymerization during the epoxidation reaction by use of caustic alkali. After the completion of caustic alkali addition, the reaction is continued at a temperature lower than 10° C. for about 0.5 to 1 hour. Then stirring is stopped, water layer is separated from resin layer and volatile matter is removed, by which a viscous liquid or low melting solid of yellow to brown resinous substance is produced. Resulting epoxy resin is a compound having molecular weight of from 400 to 2,000, oxygen content of from 5 to 13 percent by weight (content of epoxy oxygen is from 2 to 7 percent by weight, epoxy equivalent of from 180 to 1,000 g./eq.). It contains, in its molecule, more than one active ether radical, number of which varies according to molecular weight and terminal epoxy radicals of average from 1.6 to 2.0.

As the novel epoxy resin of the present invention, possesses many cross-linking points at curing, and many advantageous points in regard to the solubility with other high molecular substances. Accordingly it is a useful resin which exhibits superior properties in the field of application of conventional epoxy resin e.g. adhesive, painting, insulation varnish, casting articles, laminated articles, molding material, etc.

A more comprehensive understanding of the invention can be obtained by referring to the following illustrative examples which are not intended, however, to be unduly limitative of the invention.

EXAMPLE 1

380 parts by weight of polyxylene glycol (poly-2.6 dimethylolmethaxylene) (melting point 65° C., molecular weight 760, oxygen content 12.0 percent by weight) and 0.5 part by weight stannic chloride were mixed. While heating the content at a temperature of from 85 to 90° C., 92 parts by weight of epichlorohydrin was dropped over the period of about 16 hours. Stirring was continued at the same temperature for 24 hours after dropping the epichlorohydrin. Then the surrounding bath was changed to a water ice bath to reduce the temperature of the content to 10° C. The content was diluted by 400 parts by weight of toluene and 80 parts by weight of 50 percent (by weight) caustic soda solution was added while stirring. In 30 minutes the toluene layer was separated, washed by water, dried by anhydrous sodium sulfate. Distilling the volatile matter off at a reduced pressure, 430 parts by weight of a pale yellow resin having low melting point was obtained. No chlorine was recognized by the Beilstein reaction. The epoxy determination was conducted by the hydrochloric acid-dioxane method. This resin had epoxy content of 500, molecular weight (by Rast method) of 880, oxygen content of 15.5 percent by weight, and melting point of 45° C. Heat distortion temperature was 150° C. when 11.0 phr. of metaphenylene diamine was added to and fused together with the resin followed by curing at a temperature of 200° C. for 1 hour. Heat distortion temperature was 170° C. when 20 phr. of metaphenylene diamine was added. Heat distortion temperature was elevated to 190° C. when 30 phr. of metaphenylene diamine was used. This fact shows that the active methylene ether radical in the molecule reacts to afford a compact cured object.

EXAMPLE 2

500 parts by weight of polybenzene glycol (melting point 70° C., molecular weight 1000, oxygen content 11.5 percent by weight), 0.6 part by weight of stannic chloride and 100 parts by weight of toluene were added, and 92 parts by weight of epichlorohydrin was dropped at a temperature of from 85° C. to 90° C. over the period of about 20 hours. Stirring is continued at the same temperature for further 24 hours after completion of dropping. When cooled as in Example 1, added with 80 parts by weight of 50 percent (by weight) caustic soda solution, and treated as in Example 1, 550 parts by weight of a yellow resin having low melting point was produced. It had epoxy content of 600, molecular weight of 1100, oxygen content of 14.0 percent by weight, melting point of 50° C. and heat distortion temperature of 185° C. when 30 phr. of metaphenylene diamine was added.

EXAMPLE 3

460 parts by weight of polynaphthalene glycol (melting point 65° C., molecular weight 920, oxygen content 10.3 percent by weight), 0.8 part by weight of zinc chloride and 200 parts by weight of toluene are admixed. 92 parts by weight of epichlorohydrin was dropped at a temperature of from 85° C. to 90° C. during the period of about 20 hours. After dropping was completed, the treatment was conducted as in Example 1, by which 500 parts by weight of yellowish brown resin having a low melting point was obtained. This resin had epoxy content of 550, molecular weight of 1000, oxygen content of 12.5 percent by weight and melting point of 50° C. When 30 phr. of metaphenylene diamine was added, it showed the heat distortion temperature of 195° C.

EXAMPLE 4

600 parts by weight of polyduren glycol (melting point 220 C,. molecular weight 1200, oxygen content 10.1 percent by weight), 0.7 part by weight of zinc chloride and 200 parts by weight of toluene were admixed. 92 parts by weight of epichlorohydrin was dropped at a temperature of 85° C. to 90° C. over the period of about 20 hours. After dropping was completed, the treatment as in Example 1 was applied, by which 500 parts by weight of yellowish brown low melting point resin was obtained. This resin had epoxy content of 900, molecular weight of 1300, oxygen content of 12.5 percent by weight and melting point of 150° C. When 30 phr. of metaphenylene diamine was added, the heat distortion temperature was 230° C.

EXAMPLE 5

175 parts by weight of dimethylol toluene formaldehyde resin (molecular weight 350, oxygen content 12.5 percent by weight), 0.3 part by weight of stannic chloride, were admixed. 92 parts by weight of epichlorohydrin was dropped at a temperature of from 85° C. to 90° C. over the period of about 16 hours. After completion of dropping, the same after-treatment as in Example 1 was applied, by which 220 parts by weight of yellow viscous transparent resin was obtained.

EXAMPLE 6

238 parts by weight of dimethylol xylene formaldehyde resin (molecular weight 475, oxygen content 11.0 percent by weight), 0.5 part by stannic chloride were admixed. 92 parts by weight of epichlorohydrin were dropped at a temperature of from 85° C. to 90° C. over the period of about 16 hours. After dropping was completed the after treatment was applied as in Example 1 and 280 parts of a pale yellowish brown, viscous, transparent resin were obtained. This resin had epoxy equivalent of 300, molecular weight of 550, and oxygen content of 17 percent. When cured by 20 phr. of metaphenylene diamine, the heat distortion temperature showed 185° C.

The dimethylol xylene formaldehyde resin was prepared from xylene formaldehyde resin as follows (cf. application Ser. No. 383,505 of the same inventor titled Methylol Containing Aromatic Formaldehyde Resin filed July 17, 1964.

100 parts by weight of xylene formaldehyde resin (oxygen content 11.0 percent by weight, molecular weight 450) and 30 parts by weight of acetic anhydride were brought into solution completely and cooled down to 10° C. A mixture of 35 parts by weight of acetic anhydride, and 1 part by weight of concentrated sulfuric acid were gradually dropped. After dropping stirring was continued at a temperature of from 30° C. to 35° C. for 4 hours. 200 parts by weight of mixed xylene was added. The resin layer was washed by water. 20 parts by weight of caustic soda (equivalent to the saponification value) was added to the washed substance as one normal solution, and stirring was continued for one hour. After sufficiently washing the product by water, 95 parts by weight of a yellow viscous resin was obtained by use of steam distillation followed by dehydration at a reduced pressure.

What is claimed is:

1. An epoxy resin comprising at least one active methylene ether radical (—CH$_2$OCH$_2$—) directly connected to two aromatic hydrocarbon nuclei in the molecular chain and an average of from 1.6 to 2.0 terminal vicinal epoxy radicals.

2. An epoxy resin having the structural formula:

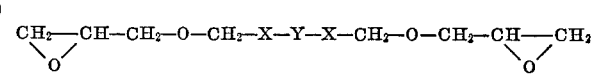

wherein X is a member selected from the group consisting of alkyl-substituted and non-substituted aromatic hydrocarbon nuclei and Y is a member selected from the group consisting of a methylene ether radical and a composite group in which at least two radicals selected from the group consisting of acetal radicals

in which $n$ is an integer of from 1 to 4], methylene groups (—CH$_2$—) and methylene ether radicals are connected to each other through 1 to 10 X groups, the terminal radicals of said composite group being radicals selected from the group consisting of acetal, methylene and methylene ether radicals and said composite group having at least one methylene ether radical.

3. The epoxy resin according to claim 2, wherein X is toluene.

4. The epoxy resin according to claim 2, wherein X is xylene.

5. An epoxy resin having the structural formula:

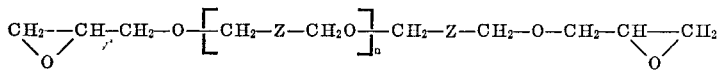

wherein n is an integer of from 1 to 9 and Z is a member selected from the group consisting of an alkyl-substituted and a non-substituted aromatic hydrocarbon nucleus.

6. The epoxy resin according to claim 5, wherein Z is benzene.

7. The epoxy resin according to claim 5, wherein Z is m-xylene.

8. The epoxy resin according to claim 5, wherein Z is durene.

9. The epoxy resin according to claim 5, wherein Z is naphthalene.

10. A process for producing an epoxy resin comprising at least one active methylene ether radical ($-CH_2OCH_2-$) directly connected to two aromatic hydrocarbon nuclei in the molecular chain and an average of from 1.6 to 2.0 terminal vicinal epoxy radicals, which comprises adding a Friedel-Crafts catalyst to a member selected from the group consisting of a polyaromatic hydrocarbon glycol and a dimethylol aromatic hydrocarbon formaldehyde resin in an amount of 0.1 to 0.2% by weight of the catalyst, based on the total weight of the reaction mixture, gradually adding thereto epichlorohydrin in a proportion of 2 moles per mole of the glycol compound at a temperature of 70° to 100° C. in at least 15 hours, thereafter effecting the reaction at the same temperature for at least 24 hours and then diglycidylating the resulting product with an alkali metal hydroxide solution in an amount equivalent to the epichlorohydrin at a temperature of 0° to 10° C. for a period of 30 minutes to one hour.

References Cited

FOREIGN PATENTS 813,865   5/1959   Great Britain.

WILLIAM H. SHORT, *Primary Examiner.*

T. PERTILLA, *Assistant Examiner.*

U.S. Cl. X.R.

161—184; 260—67